United States Patent [19] [11] 4,294,740
Mizuguchi et al. [45] Oct. 13, 1981

[54] PROCESS FOR PREPARING ACRYLIC RESIN EMULSIONS

[75] Inventors: Ryuzo Mizuguchi, Yawata; Skinichi Ishikura, Osaka; Keizou Ishii, Ashiya; Tamotu Yoshioka, Osaka, all of Japan

[73] Assignee: Nippon Paint Co., Ltd., Japan

[21] Appl. No.: 143,923

[22] Filed: Apr. 23, 1980

[30] Foreign Application Priority Data

Apr. 23, 1979 [JP] Japan .................................. 54-50726

[51] Int. Cl.³ ............................................... C08F 2/22
[52] U.S. Cl. ............................... 260/29.6 RB; 526/201
[58] Field of Search ............... 260/29.6 RB, 29.6 XA, 260/29.7 UP; 526/201, 203

[56] References Cited

U.S. PATENT DOCUMENTS

| | | | |
|---|---|---|---|
| 3,383,346 | 5/1968 | Smith | 260/29.6 RB |
| 3,424,706 | 1/1969 | Smith | 260/29.6 RB |
| 3,707,585 | 12/1972 | Okamoto | 526/201 |
| 3,720,645 | 3/1973 | Nistri | 528/502 |
| 4,011,388 | 3/1977 | Murphy | 526/201 |
| 4,026,962 | 5/1977 | Lambla | 526/201 |
| 4,055,530 | 10/1977 | Poppe | 260/29.6 RB |

*Primary Examiner*—Paul R. Michl
*Attorney, Agent, or Firm*—Wenderoth, Lind & Ponack

[57] ABSTRACT

A process for preparing a substantially lump free acrylic resin emulsion by emulsion polymerization of one or more acrylic monomers in water in the presence or absence of an emulsifier or a dispersing agent, wherein the polymerization is carried out in the presence a water-insoluble resin which is immiscible with the acrylic resin in the emulsion and has a softening or melting point of 20° C. or higher.

1 Claim, No Drawings

PROCESS FOR PREPARING ACRYLIC RESIN EMULSIONS

The present invention relates to a process for preparing an acrylic resin emulsion. More particularly, it relates to a process for preparing an acrylic resin emulsion without production of lumps so as to render it easily and smoothly filterable.

Acrylic resin emulsions are usually prepared by polymerization of various kinds of acrylic monomers in water, usually in the presence of an emulsifier or a dispersing agent. Depending on the kind of the emulsifier or the dispersing agent and the reaction conditions, a large amount of lumps is produced in the reaction system so that the filtration of the reaction mixture after the polymerization is hardly accomplished.

In order to minimize the production of lumps in the reaction system so as to accomplish the filtration easily and smoothly, an extensive study has been made. As the result, it has now been surprisingly found that the incorporation of a certain specific water-insoluble resin into the reaction system can inhibit the production of lumps during the polymerization efficiently and shorten the time required for filtration markedly.

According to the present invention, there is provided a process for preparing an acrylic resin emulsion by polymerization of one or more acrylic monomers in water in the presence or absence of an emulsifier, characterized in that the polymerization is carried out in the presence of a water-insoluble resin which resin is immiscible with the produced acrylic resin in the emulsion and has a softening or melting point of 20° C. or higher.

As the said water-insoluble resin to be used in the invention, there may be employed any one which is immiscible with the acrylic resin in the emulsion and has a softening or melting point of 20° C. or higher. Particularly preferred examples of such water-insoluble resins are chlorinated polyethylenes, chlorinated polypropylenes, etc. The amount of the water-insoluble resin may be from 0.1 to 50 parts by weight, preferably from 0.5 to 30 parts by weight, per 100 parts by weight of the total amount of the acrylic monomers. When the amount is less than 0.1 part by weight, the production of lumps can not be sufficiently inhibited. When the amount exceeds 50 parts by weight, the emulsion polymerization does not proceed smoothly, and the yield of the acrylic resin will be lowered.

The polymerization of acrylic monomers may be carried out in a per se conventional manner for emulsion polymerization, except that the said water-insoluble resin is incorporated into the polymerization system.

As the acrylic monomers, there may be exemplified alkyl acrylates and methacrylates (e.g. methyl acrylate, methyl methacrylate, ethyl acrylate, n-butyl acrylate, n-butyl methacrylate, 2-ethylhexyl acrylate), hydroxyl group-containing monomers (e.g. 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol, metallyl alcohol), aromatic monomers (e.g. styrene, α-methylstyrene, vinyltoluene, t-butylstyrene), carboxyl group-containing monomers (e.g. acrylic acid, methacrylic acid, crotonic acid, itaconic acid, maleic acid, fumaric acid), amide monomers (e.g. acrylamide, methacrylamide), nitrile monomers (e.g. acrylonitrile, methacrylonitrile), butadiene, isoprene, ethylene, propylene, vinyl chloride, vinyl acetate, etc.

Usually, an emulsifier or a dispersing agent is employed in the reaction system. As the emulsifier or the dispersing agent, there may be employed any conventional one. For example, at least one kind of anionic surface active agent, cationic surface active agent, amphoteric surface active agent and nonionic surface active agent which are described in Soichi Muroi's "Chemistry of High Polymer Latex", pages 15 to 19 (published by Kobunshi Kankokai in 1970) may be advantageously employed. When the acrylic monomer includes an ampho-ionic one, for instance, as described in U.S. Pat. No. 4,116,912, the produced polymer can maintain a stable emulsion or dispersion state without using any emulsifier or dispersing agent. Thus, in such case, the use of any emulsifier or dispersing agent is unnecessary.

As the polymerization initiator, there may be used at least one of the usual initiators such as organic peroxides, organic azo compounds, inorganic peroxides and redox initiators.

A typical procedure for carrying out the process of the invention is as follows:

To water containing or not containing an emulsifier or a dispersing agent and kept at a polymerization temperature in a reaction vessel, a solution containing an acrylic monomer(s) and the said specific water-insoluble resin is dropwise added in the presence of a polymerization initiator, and after completion of the dropwise addition, the mixture is subject to aging. Alternatively, all of the components as above stated may be charged into a reaction vessel to effect batchwise the polymerization reaction. The polymerization temperature is usually from 30 to 100° C., and the polymerization time is ordinarily from 10 to 48 hours.

In this polymerization process, the amount of lumps produced during the reaction is greatly decreased, in comparison with conventional procedures, owing to the presence of the said water-insoluble resin. The subsequent filtration of the thus obtained emulsion can be effected smoothly within a short time. Particularly when the polymerization is effected using an ampho-ionic acrylic monomer and not using any emulsion or dispersing agent, the shortening of the time for filtration is remarkable.

The present invention will be explained further in detail by the following Examples, wherein part(s) and % are by weight.

EXAMPLE 1

Into a 2 liter-volume flask equipped with a stirrer, deionized water (408 parts) and sodium dodecylbenzenesulfonate ("Neo Pellex 05 Powder" manufactured by Kao Atlas Co., Ltd.) (20 parts) are charged, and the temperature is elevated up to 80° C. A solution comprising azobisisocyanovaleric acid (4 parts), dimethylethanolamine (3.8 parts) and deionized water (80 parts) is added thereto, and immediately thereafter, dropwise addition of a solution containing styrene (108 parts), methyl methacrylate (108 parts), n-butyl acrylate (144 parts) and chlorinated polypropylene ("Superchlone 306" manufactured by Kokusaku Pulp K.K.; M.P., 150° C.) (40 parts) is initiated. The addition is completed in 2 hours. The stirring is continued for further 1 hour, and then the reaction is stopped.

When the thus obtained emulsion is filtered through a wire net of 325 mesh, the filtration is completed in 5 minutes. The non-volatile component of the resultant emulsion is 42%, and no lump are observed.

Examples 2 to 4 and Comparative Example 1

In the same manner as in Example 1, preparation of emulsions and subsequent filtration thereof is carried out. The compositions and the properties of the thus obtained emulsions are shown in Table 1.

TABLE 1

| Composition*1 (part(s)) | Example 2 | Example 3 | Example 4 | Comparative Example 1 |
| --- | --- | --- | --- | --- |
| Components charged initially | | | | |
| Deionized water | 408 | 408 | 408 | 408 |
| Compound A | 4 | 4 | 8 | 4 |
| DMEA | 0.73 | 0.73 | 1.46 | 0.73 |
| Components charged secondly | | | | |
| ACVA | 3 | 3 | 3 | 3 |
| DMEA | 2.85 | 2.85 | 2.85 | 2.85 |
| Deionized water | 60 | 60 | 60 | 60 |
| Components added dropwise*2 | | | | |
| ST | 108 | 108 | 108 | 108 |
| MMA | 108 | — | 108 | 108 |
| n-BMA | — | 108 | — | — |
| 2-EHA | 144 | 144 | 144 | 144 |
| 2-HEA | 40 | 40 | 40 | 40 |
| Superchlone 306 | 4 | — | 8 | — |
| Superchlone 510 | — | 20 | — | — |
| Components charged lastly*3 | | | | |
| ACVA | 1 | 1 | 1 | 1 |
| DMEA | 0.95 | 0.95 | 0.95 | 0.95 |
| Deionized water | 20 | 20 | 20 | 20 |
| Filtration time (min) | 5 | 10 | 5 | 90 |
| Amount of lump (%) | None | None | None | 0.2 |
| Non-volatile component (%) | 45 | 45 | 45 | 45 |

Note:
*1The abbreviations show the following meanings:

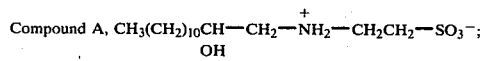

Compound A, $CH_3(CH_2)_{10}CH-CH_2-\overset{+}{N}H_2-CH_2CH_2-SO_3^-$; OH

DMEA, dimethylethanolamine; ACVA, azobisisovaleric acid; ST, styrene; MMA, methyl methacrylate; n-BMA, n-butyl methacrylate; 2-EHA, 2-ethylhexyl acrylate; 2-HEA, 2-hydroxyethyl acrylate.
*2Dropwise added in 1 hour.
*3Charged in 15 minutes.

REFERENCE EXAMPLE 1

When the emulsion obtained in Example 2 is admixed with ethyleneglycol monobutyl ether, no coagulation occurs. To the contrary, partial coagulation is caused in case of the emulsion obtained in Comparative Example 1.

EXAMPLE 5

In a 2 liter-volume flask equipped with a stirrer, a cooler, a temperature-controlling apparatus and a tube for introductin of nitrogen gas, deionized water (400 parts) is charged, and while stirring at 80° C. in nitrogen atmosphere, potassium persulfate (6 parts) and sodium hydrogensulfite (2 parts) are added thereto. A mixture comprising 3-dimethyl(methacryloylethyl)ammonium propanesulfonate (25 parts) and deionized water (75 parts) and another mixture comprising methyl methacrylate (158 parts), styrene (158 parts), n-butyl acrylate (159 parts) and "Superchlone 306" (25 parts) are dropwise added thereto separately and simultaneously in 12 minutes at the same temperature. After completion of the addition, a mixed solution comprising potassium persulfate (1.5 parts), sodium hydrogensulfite (0.5 part) and deionized water (25 parts) is added at the same temperature, and stirring is continued for further 45 minutes to obtain an aqueous resin dispersion.

When the thus obtained dispersion is filtered through a wire net of 400 mesh, the filtration is completed in 5 minutes. The non-volatile component of the resultant dispersion is 50%, and no lumps are observed.

A resin dispersion obtained in the same manner as above but not using "Superchlone 306" requires 30 minutes for filtration.

What is claimed is:
1. In a process for preparing a substantially lump-free acrylic resin emulsion by emulsion polymerization of one or more acrylic monomers in water in the presence or absence of an emulsifier or a dispersing agent and then filtering the polymerization product, the improvement which comprises performing the polymerization in the presence of a water-insoluble resin which is immiscible with the acrylic resin in the emulsion and has a softening or melting point of 20° C. or higher, said water-insoluble resin being a chlorinated polyethylene or a chlorinated polypropylene.

* * * * *